United States Patent [19]

Hayashi

[11] Patent Number: 5,253,360
[45] Date of Patent: Oct. 12, 1993

[54] FACSIMILE DEVICE HAVING CONTINUOUS OPERATING CAPABILITIES IMMEDIATELY AFTER RECOVERY FROM TROUBLE AND RELATED METHOD

[75] Inventor: Katsuhiko Hayashi, Tachikawa, Japan

[73] Assignee: Kabushiki Kaisha Toshiba, Kawasaki, Japan

[21] Appl. No.: 902,797

[22] Filed: Jun. 24, 1992

Related U.S. Application Data

[63] Continuation of Ser. No. 810,456, Dec. 12, 1991, abandoned, which is a continuation of Ser. No. 450,262, Dec. 13, 1989, abandoned.

[30] Foreign Application Priority Data

Dec. 16, 1988 [JP] Japan .................. 63-316148

[51] Int. Cl.[5] .................. G06F 11/34; G06F 11/00
[52] U.S. Cl. .................. 395/575; 364/DIG. 1;
364/285.2; 364/267.3; 364/187; 358/400;
371/12; 371/66
[58] Field of Search .................. 358/400; 371/12, 66;
395/575; 364/187

[56] References Cited

U.S. PATENT DOCUMENTS

| 4,458,307 | 7/1984 | McAnlis et al. | |
|---|---|---|---|
| 4,654,821 | 3/1987 | Lapp . | |
| 4,697,266 | 9/1987 | Finley | 371/12 |
| 4,703,481 | 10/1987 | Fremont | 371/12 |
| 4,763,333 | 8/1988 | Byrd | 371/66 |
| 4,907,150 | 3/1990 | Arroyo et al. | |
| 4,912,707 | 3/1990 | Kogge et al. | 371/12 |
| 4,920,427 | 9/1990 | Hirata | 358/437 |
| 4,941,087 | 7/1990 | Kap | 395/725 |
| 4,959,774 | 9/1990 | Davis . | |
| 5,008,786 | 4/1991 | Thatte | 395/425 |
| 5,043,866 | 8/1991 | Myre, Jr. et al. | 371/12 |

Primary Examiner—Parshotam Lall
Assistant Examiner—Krisna Lim
Attorney, Agent, or Firm—Finnegan, Henderson, Farabow, Garrett & Dunner

[57] ABSTRACT

In a facsimile device, an application program to perform "concurrent" transmission, multicopy, etc., is divided beforehand into a plurality of phases each being allocated a phase value for identifying purposes. A phase value corresponding to a predetermined phase such as the processing "wait for an operation" which is to be executed at the beginning of the application program is registered in a non-volatile memory. The following processes are sequentially repeated to execute the appropriate application program:

(a) A phase of the application program to be executed is specified in accordance with a phase value registered in the non-volatile memory;

(b) The program allocated to the specified phase is executed; and (c) The phase value registered in the non-volatile memory is updated with the phase value of a phase which the program to be executed next is allocated, in response to the ending of the program to be executed. In any case, when the facsimile device is started up, the process (a) is started. Thus, even if the application operation is interrupted due to trouble such as power stoppage, the application operation is continued smoothly when the facsimile is recovered.

8 Claims, 5 Drawing Sheets

FACSIMILE DEVICE HAVING CONTINUOUS OPERATING CAPABILITIES IMMEDIATELY AFTER RECOVERY FROM TROUBLE AND RELATED METHOD

This application is a continuation of application Ser. No. 07/810,456, filed Dec. 19, 1991 now abandoned, which is a continuation of application Ser. No. 07/450,262, filed Dec. 13, 1989 now abandoned.

BACKGROUND OF THE INVENTION

1. Field of the Invention

The present invention relates to a method of executing application programs by a facsimile device and a facsimile device having a function of automatically reopening the execution of the application program in response to recovery from trouble, and more particularly to a method and apparatus for starting and reopening the interrupted execution of the application program immediately in response to recovery from trouble.

2. Description of the Prior Art

Usually, memories required for facsimile devices are program memories for storing various application programs, memories for storing picture information, data memories for storing parameters designating various operational modes set by the user when required, and main memories for temporarily storing various processed data including control data and serving as a work area for a main controller for the facsimile.

Generally, the program memories include a ROM as a non-volatile memory. The memories for storing picture information each are a volatile memory which comprises a RAM excellent in read/write speed, or a non-volatile disc device such as magnetic disc easy to store a large amount of data although less excellent than a RAM in read/write speed. The data memories and main memory used are usually RAMs because read/write speed is considered preferentially. Therefore, if, in a conventional facsimile device, power supply to the facsimile device is cut off during operation due to an unexpected accident such as power stoppage, at least the parameters/data would be lost. Even if power supply may be reopened thereafter, it would be required to reset parameters and then to newly start the interrupted operations from the beginning.

Recently, in order to back up power supply to a RAM for storing data such as the above parameters, an appropriate backup power source (batteries) is separately provided to constitute a non-volatile memory, for example, static-RAM, so that even if an accident such as power stoppage may occur, the set parameters and/or required data are prevented from disappearing.

However, in this case, what is stored in the backedup RAM (data memory) is only so-called static data such as the parameters and/or dial numbers. Although time and labor required for again setting those parameters and dial numbers are eliminated, the interrupted operations must be executed again from the beginning when power supply is reopened. Thus, the actual situation is not virtually improved.

For example, assume that an application operation is executed in which image data on a document, to be sent, read by a scanner is temporarily stored in a disc device (picture data memory), and then the stored image data is sent concurrently to a plurality of designated terminals. If power supply to the appropriate facsimile device is interrupted, for example, due to power stoppage, the application program under execution is reset at that time, so that even if power supply is reopened thereafter, the processing performed so far is not continued and is left interrupted. In this case, control data, etc., in the main memory (work area) is lost concurrently with the occurrence of the power stoppage, so that the progress of the processing would be unclear, namely, the interrupted operation cannot be specified. Eventually, after power supply is reopened, the transmission of the image data must be again performed at the destination terminal designated first.

As described above, with conventional facsimile devices, the RAM which constitutes a data memory can be backed up by a battery so as to constitute a non-volatile storage t thereby hold system parameters and-/or dial numbers stored in the storage irrespective of the presence of power stoppage. However, once power stoppage occurs, the application program itself would be reset, the operation performed so far is interrupted and the interrupted operation cannot be specified. Therefore, in order to reopen the application operation in response to recovery from the trouble, the application program must be reexecuted from the beginning.

SUMMARY OF THE INVENTION

It is therefore an object of the present invention to provide a method of executing an application program by a facsimile device which, even if the application program is interrupted in any form, is easy to specify the interrupted operation, and causes continuous smooth application operation thereafter.

It is another object of the present invention to provide a facsimile device having an automatically reopening function which, in response to recovery from the trouble, ensures the instantaneous and automatic reopening of the operation interrupted due to occurrence of trouble such as power stoppage.

In order to achieve these objects, according to the present invention, an application program is divided beforehand into a plurality of phases each being allocated a phase value for identifying purposes. A predetermined phase value is registered in a non-volatile memory. Thus, the following processes are repeated sequentially to execute the application program:

(a) The phase of the application program to be executed is specified in accordance with the phase value registered in the non-volatile memory.

(b) The program allocated to the specified phase is executed.

(c) The phase value registered in the non-volatile memory is updated with the phase value of a phase which a program to be next executed is allocated, in response to the termination of execution of the former program.

Thus, if, for example, trouble such as power stoppage during execution of an application operation occurs, the application program itself is thereby temporarily reset, but data on the phase of the application program has been executed when the trouble occurred or on the phase which was about to be executed continue to be stored as the phase values in the non-volatile memory. Therefore, it is possible to specify the phase (divided program), interrupted or about to be executed, in accordance with the recognition of the phase value. When the facsimile device is started again in response to recovery from the trouble, the program allocated to the specified phase can be executed, namely, the above (a)

processing can be started, to thereby cause smooth continuation of the application operation.

In view of such function provided by the method of executing an application program, the present invention provides a facsimile device including:

(A) program memory means beforehand storing the application program which is beforehand divided into a plurality of phases each being allocated a phase value for identifying purposes;

(B) non-volatile read/write memory means for storing the phase values of the application program and parameters designated or input by the user;

(C) first control means for recognizing the phase values stored in the non-volatile memory means and specifying one of the programs each divided into the phases;

(D) second control means for referring to the parameters stored in the non-volatile memory means while executing the specified program;

(E) third control means for updating the phase value stored in the non-volatile memory means with the phase value of a phase which a program to be next executed is allocated, in response to the ending of the program executed by the second control means; and (F) fourth control means for starting up the first control means in response to the start-up of the facsimile device or to the update of the phase value by the third control means.

By such facsimile device, the processes (a)-(c) are substantially repeated via the first to fourth control means (C), (D), (E) and (F). In addition, in any case including recovery from trouble through the fourth control means represented by the (F), conditions where the (a) process is started are satisfied when the facsimile device is started up. Therefore, even if the application operation is interrupted in whatever situation depending on the method of executing the application program, the application operation is automatically reopened smoothly from the interrupted operation or from an operation to be executed next on the basis of the remaining phase values stored in the non-volatile memory in response to recovery from the trouble thereafter.

DESCRIPTION OF THE PREFERRED EMBODIMENT

Figure 1:
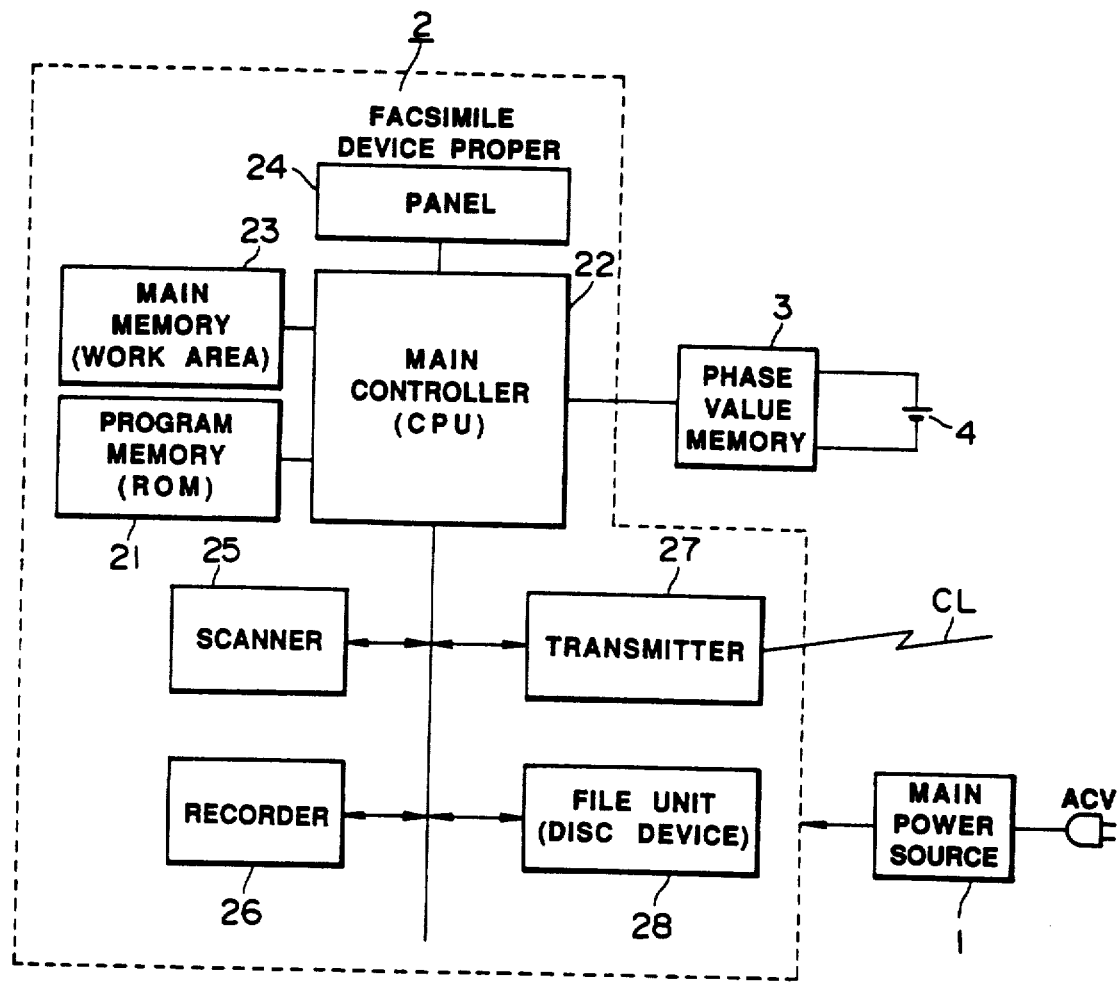
FIG. 1 is a block diagram of one embodiment of a facsimile device having an automatically reopening function operated in response to recovery from trouble according to the present invention.

FIG. 1 illustrates one embodiment of a facsimile device according to the present invention having an automatic program reopening function operated in response to recovery from trouble. As shown in FIG. 1, the facsimile device mainly includes a main power source 1 which produces a power source voltage to drive the facsimile device on the basis of the supply of an ACV (alternating current voltage), a facsimile device proper 2 which performs various operations on the basis of power supply from the main power source 1, a phase value memory 3 which may be, for example, a RAM which stores various parameters inclusive of phase values to be described later and designated or inputted by the user, and a battery 4 which is a backup power source which converts the phase value memory 3 to a non-volatile memory.

As shown in FIG. 1, the facsimile device proper 2 which starts to operate in response to power supply from the main power supply 1 includes a program memory 21, for example, of a ROM, which beforehand stores various application programs to realize various operations as the facsimile device, a main controller (CPU) 22 which executes the application programs stored in the program memory 21 and provides the basic control on the whole facsimile device and including control to reading and writing of phase values and parameters from and to the phase value memory 3, a main memory (work area) 23, for example, of a RAM which temporarily stores programs and data each time each of application programs is executed by the main controller 22, a panel 24 which displays on a display (not shown) the operation guides of the facsimile device for the operator, the progress of processes performed, various alarms, etc., in accordance with commands from the main controller 22 and which reports to the main controller 22 the contents of various commands (operations) keyed in by the operator via an input unit such as keyboard (not shown), a scanner 25 which reads a document image in accordance with a command from the main controller 22, a recorder 26 which prints and records image data designated by the main controller 22 in accordance with a command from the main controller 22, a transmitter 27 which includes a MODEM connected to a communication line CL and transmits and receives picture data in accordance with a command from the main controller 22, and a file unit 28 such as a magnetic disc storage unit which stores as a file image data read out by the scanner 25 or received via the transmitter 27 in accordance with a command from the main controller 22.

According to the facsimile device, if power supply from the main power source 1 is cut off due to trouble such as power stoppage, the main controller 22 as well as the various elements constituting the facsimile unit 2 is disabled, and thus the facsimile device cannot perform any functions as such since the time when power supply is cut off. Only the phase value memory 3 converted to a non-volatile storage under backup by the battery continues to normally hold the phase values and parameters stored at that time. Of course, the program memory 21, which comprises a ROM, for example, and the file unit 28 which comprises, for example, a magnetic disc storage device, as the constituents of the facsimile device proper 2, are put into an non-operational state concurrently with the occurrence of the power stoppage. However, since these elements are all so-called non-volatile memories, the various application programs stored in these memories or the picture data file themselves are not lost.

The application programs stored in the program memory 21 and the phase values stored in the phase value memory 3 will now be described below. In the facsimile device of the particular embodiment, any of the application programs stored in the program memory 21 has such a program structure that they cooperate with the main controller to constitute a control system logically shown in FIG. 2.

Figure 2:
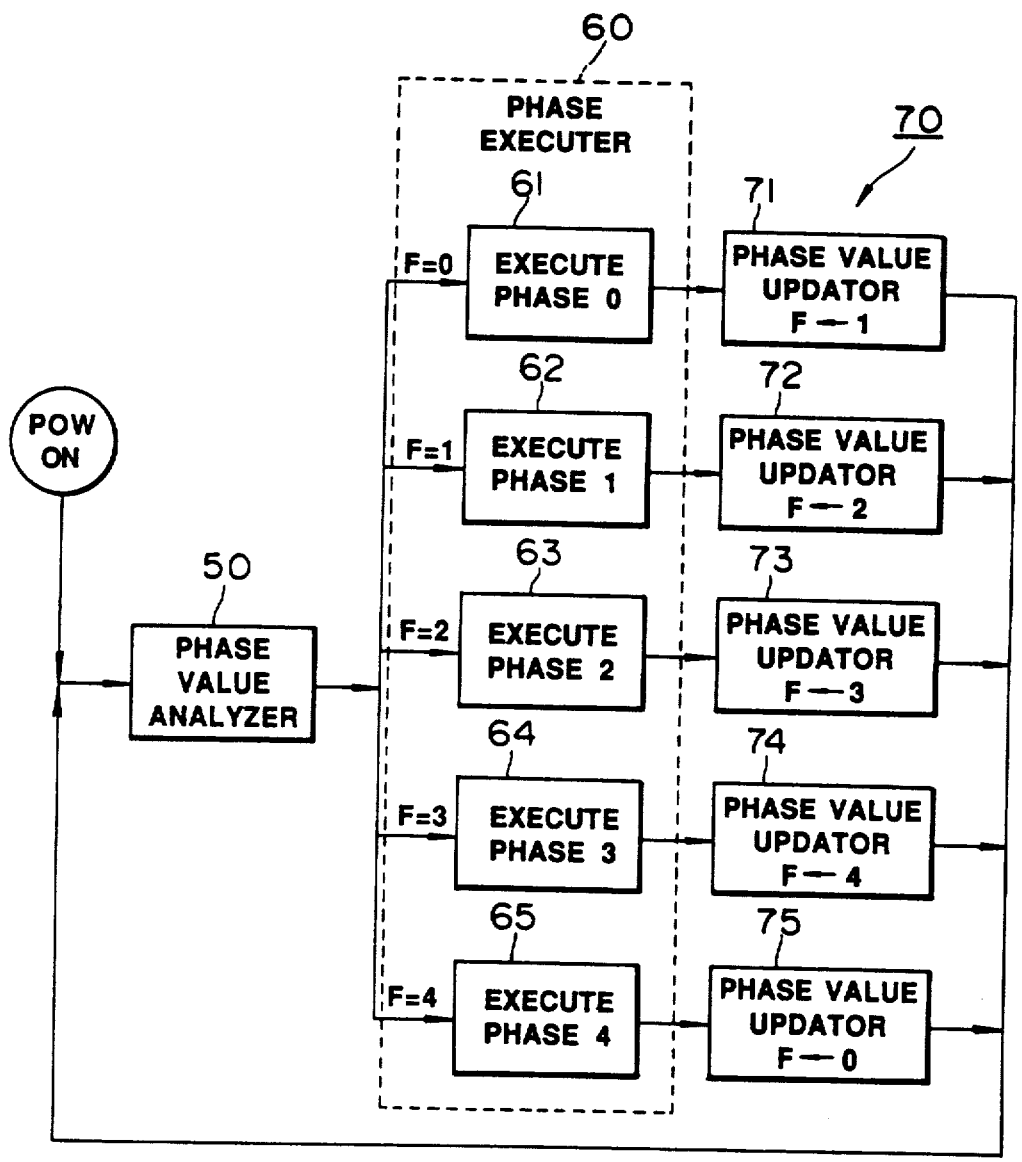
FIG. 2 is a functional block diagram of the facsimile device of the particular embodiment and a basic control structure in the execution of an application program according to the present invention.

As will be clear from FIG. 2, each application program is divided beforehand into phases each of which is allocated a phase value in order to identify itself. The application program illustrated in FIG. 2 is divided into five phases to which corresponding phase values 0–4 are allocated. Each application program basically includes a phase value analyzer 50, a phase executer 60 and a phase value updator 70 which operates in conjunction with the main controller 22. As shown in FIG. 2, by repeated processes performed by these elements, the intended operation is executed. The functions and processing aspects of the phase value analyzer 50, phase executer 60 and phase value updator 70 will now be described.

First, the phase value analyzer 50 reads the phase values stored in the phase value memory 3 in response to the start-up of the facsimile device due to turning on of the power source or in response to the completion of update of the phase value by the phase value updator 70, and analyzes which of the divided phases the phase values indicate. By the phase value analysis of the analyzer 50, a phase to be executed next by the phase executer 60 is specified.

The phase executer 60 executes the specified phase. For example, in FIG. 2, if the analyzed phase value F is "0" and a phase 0 corresponding to that phase value is specified, the "Phase 0" defined as a phase executor 61 is executed. The "Phase 0" corresponds to a process such as "a wait for an operation (or keying-in by the operator)" executed first in each application program.

The phase value updator 70 updates the existing phase value F, stored in the phase value memory 3, in response to the completion of execution of one phase by the phase executer 60 with a phase value F allocated to a phase to be executed next. For example, if one phase executed by the phase executer 60 is "Phase 0", the phase value "0" allocated to the "Phase 0" and stored in the phase value memory 3 at that time is updated with a phase value "1" by the phase value updator 70. Thus the updated phase value is then analyzed by the phase value analyzer 50. Thus, the phase executed next by the phase executor 60 is specified satisfactorily.

As will be clear from the above, the phase value memory 3 is a structure controlled by the application program and main controller 22 and stores the new phase value F updated by the phase value updator 70 each time the phase value is updated. Therefore, as long as the phase value memory 3 is a non-volatile one and continues to hold the phase value F normally even if power stoppage occurs, only the progress of execution of the appropriate application program continues to be held normally. If the facsimile unit proper 2 is restarted in response to recovery from such trouble, the phase value analyzer 50 first executes the above analyzing process about the phase values stored in the phase value memory 3. Therefore, even if the application operation is interrupted due to the occurrence of such trouble, it is automatically reopened from the interrupted operation or from an operation to be executed next.

If the application program ends normally, the phase value "0" allocated to the phase "Phase 0" to be executed at the beginning of the program is usually stored in the phase value memory 3 in the last phase value update by a section defined as a phase value updator 75 in FIG. 2.

Referring next to FIGS. 3–8, more specific execution of an application program by the facsimile device of the particular embodiment will now be described. Here, as an example of application programs stored beforehand in the program memory 21, a "concurrent transmission" program, a "multicopy" program and a "journal output" program will be taken. Also here, a first phase value Fm to identify as the phase value F one of the application programs from another and a second phase value Fn (substantially corresponding to the above phase value) to identify one from another of divided phases of each application program are prepared to thereby identify an operational mode itself selected and designated by the user. In the particular embodiment, if the first phase Fm is "0", a regular wait state is meant where no application programs are selected. If the first phase value Fm is "1", the "concurrent transmission" mode ("concurrent transmission" program) is meant. If the first phase value Fm is "2", the "multicopy" mode ("multicopy" program) is meant. If the first phase value Fm is "3", the "journal output" mode ("journal output" program) is meant.

Figure 3:
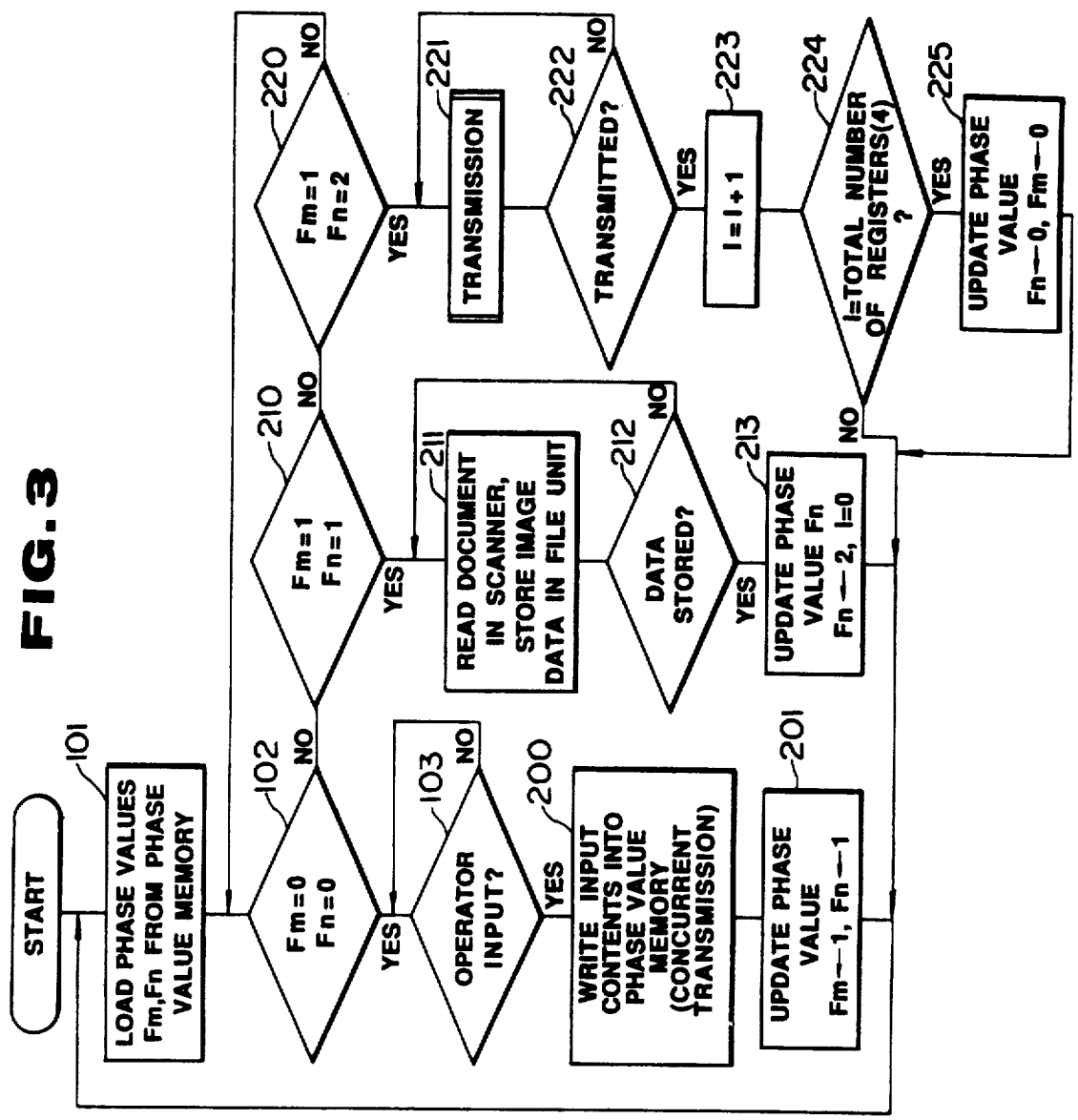
FIG. 3 is a flowchart indicative of the illustrative execution of an application program, directed to concurrent transmission of the same data to a plurality of destination terminals (hereinafter referred to as "concurrent" transmission) by the facsimile device as an embodiment of a process for executing the application program according to the present invention.
Figure 4:
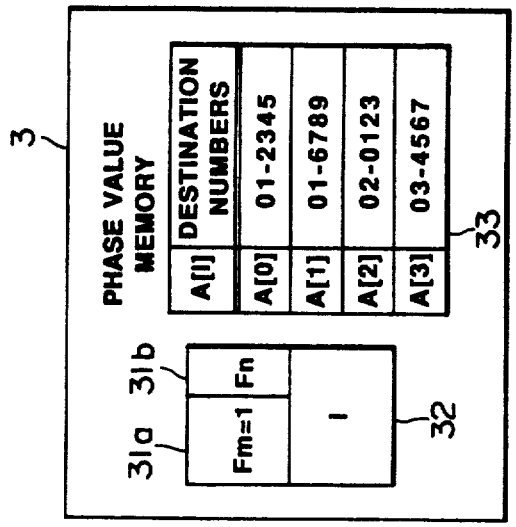
FIG. 4 schematically illustrates the structure of a phase value memory shown in FIG. 1 used when the "concurrent" transmission application program is executed.

FIG. 3 illustrates the operation of the facsimile device of the particular embodiment performed when the "concurrent transmission" mode is designated by the user, namely, when the "concurrent transmission" one of the application programs is selected. FIG. 4 schematically illustrates the structure which the phase value memory 3 has when the "concurrent transmission" mode is designated.

First, referring to FIGS. 3 and 4, the operation of the facsimile device in the "concurrent transmission" mode will be described in detail. If power supply from the main power source 1 to the facsimile unit proper 2 is started and the facsimile unit is then started, the main controller 22 of the facsimile unit proper 2 reads the phase values Fm and Fn stored in the phase value memory 3 (step 101) and analyzes these phase values. To be described later, if the respective application programs end normally, the values of these phase values Fm and Fn are both maintained at "0". When the main controller 22 recognizes this fact (step 102), it moves to a standby state where it awaits a command from the operator given through the panel 24 (step 103). Thus, when the operator designates the "concurrent transmission" mode, the main controller 22 then executes the application operation in the designated "concurrent transmission" mode in the aspects recited below:

(1) First, the main controller 22 sequentially writes the target facsimile numbers input by the operator subsequent to the designation of the "concurrent transmission" mode into a number registering area preserved in the phase value memory 3 (step 200). When the facsimile numbers of all the destinations have been recorded (for example, when a start button normally disposed on the panel 24 is pressed), it updates the phase value Fm with "1" indicative of the selection of the "concurrent transmission" program and the phase value Fn with "1" indicative of the next phase in the "concurrent transmission" program (step 201). The update of the phase value $F_m$ may be executed when the above mode designation is performed by the operator. The phase value memory 3 has a memory structure, for example, shown in FIG. 4 when the "concurrent transmission" mode is designated. In FIG. 4, reference numeral 31a denotes a phase value Fm registering area; 31b, a phase value Fn registering area; 32, a subphase i registering area and 33, a destination facsimile number registering area. In the particular embodiment, four transmission destinations are designated and these four destination numbers are defined as the arrangement A[0]-A[3]. The values [0]-[3] in the arrangement are sequentially substituted into the subphase i as the "concurrent transmission" program is executed.

(2) When the main controller 22 has executed the update of the phase value (step 201), it again reads the stored phase values Fm and Fn out of the phase value memory 3 (step 101) and analyzes these phase values.

(3) By updating the phase values (step 201), the phase value Fm is "1" and the phase value Fn is also "1" at that time. When the main controller 22 recognizes this fact (step 210), it starts reading of a document via the scanner 25 and sequentially stores the read data on the image in the file unit 28 (step 211).

(4) When the storing of the image data ends (step 212), the main controller 22 updates only the phase value Fn with "2" indicative of the further next phase in the "concurrent transmission" program and initializes the subphase i value to "0" concurrently (step 213).

(5) Subsequently, the main controller 22 reads the phase values Fm and Fn out of the phase memory 3 (step 101) and analyzes these values.

(6) By updating the phase values (step 213), the value Fm is "1" and the phase value Fn is "2" at this time. When the main controller 22 recognize this fact (step 220), it then starts to transmit the image data stored in the file unit 28 via the transmitter 27 (step 221). The main controller 22 determines a destination by referring to the subphase i registered in the phase value memory 3 each time it transmits the data. The subphase i value at this time is changed to "0" by the initialization (step 213), so that the main controller recognizes the number of the destination registered in correspondence to the arrangement A[0] as the facsimile number of the destination designated at that time and reads the number of the destination in the main memory 23. The main controller then calls the first transmission destination using the number read temporarily into the main memory and starts to transmit the data.

(7) When the transmission of the data to the destination is completed (step 222), the main controller 22 increments the subphase i value registered in the phase value memory 3 (step 223), and determines whether the incremented subphase i value has arrived at the whole number of destinations registered by the operator (4 in the particular embodiment) (step 224). In this respect, since the incremented subphase i value is "1", it determines that the whole number of destinations registered (4) has not been arrived at.

(8) During the time when the main controller determines that the subphase i value has not arrived at the whole number of registered destinations, it repeats the processes at steps 101, 220, 221, 222, 223 and 224 sequentially and reads sequentially into the main memory 23 alternately the destination numbers corresponding to the arrangement A[1]-A[3] shown by the subphase i and transmits image data to all the destinations registered in the number registering area 33 in the phase value memory 3 each time such repetition of the steps is performed once.

(9) When the main controller 22 determines that the subphase i value has arrived at the whole number of destinations registered (4) at step 224, it updates both the phase values Fm and Fn with "0" (step 225), and shifts to a standby state where it awaits the next command from the operator via steps 101 and 102 (step 103).

Figure 5:
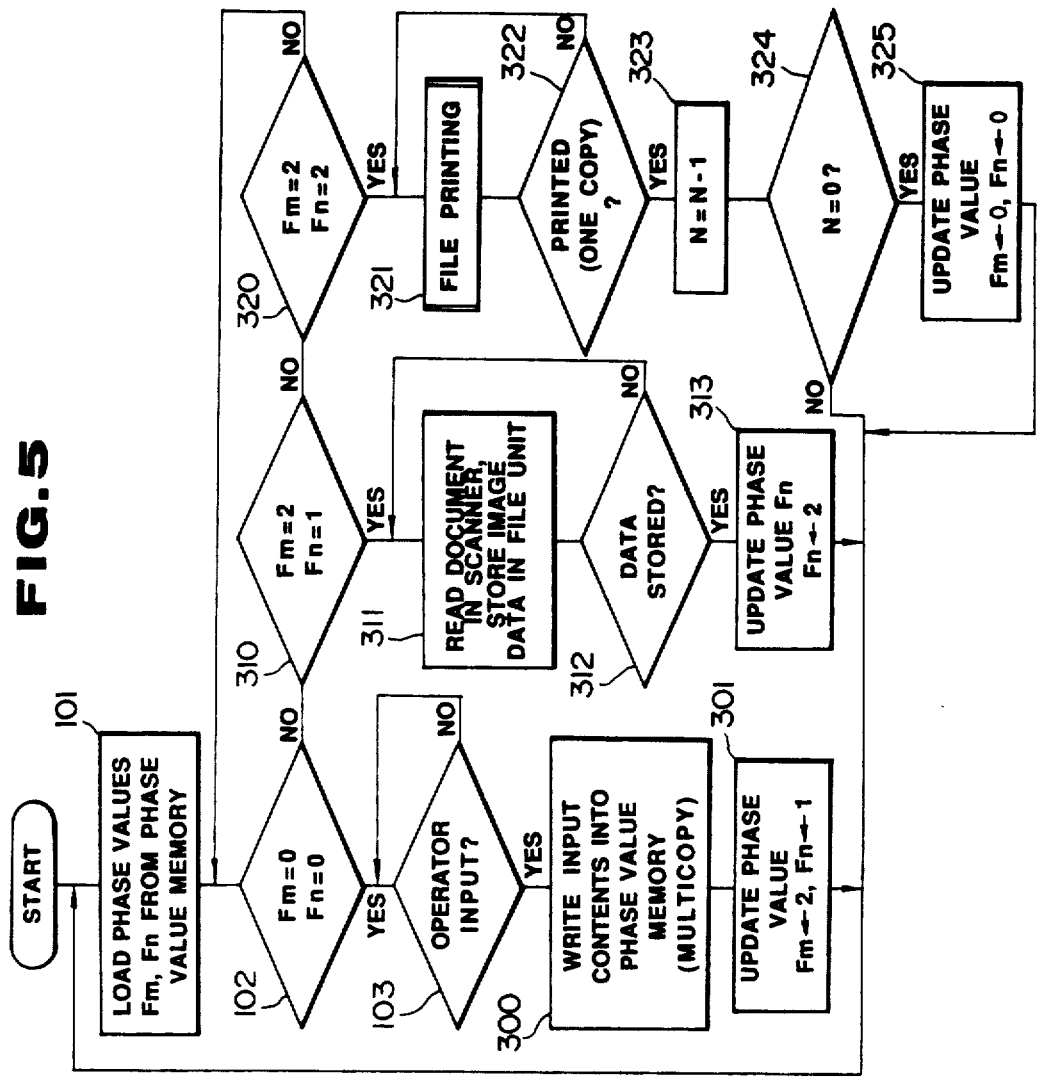
FIG. 5 is a flowchart indicative of execution of a multicopy application program by the facsimile device as an embodiment of a process for executing the application program by the facsimile device according to the present invention.
Figure 6:
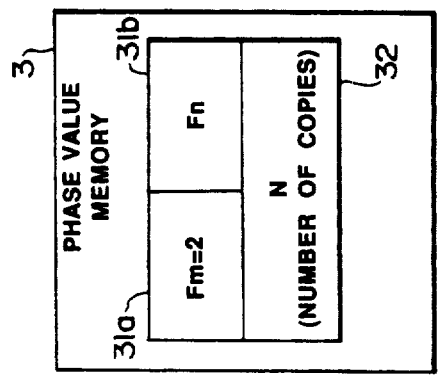
FIG. 6 schematically illustrates the structure of a phase value memory shown in FIG. 1 used when the multicopy application program is executed.

The illustrative execution of an application program in the "multicopy" mode by the facsimile device will now be described. FIG. 5 illustrates the illustrative operation of the facsimile device performed when the "multicopy" mode is designated by the user or when the "multicopy" program is selected. FIG. 6 schematically illustrates the structure of the phase value memory 3 when the "multicopy" mode is designated. Referring to FIGS. 5 and 6, the operation of the facsimile device in the "multicopy" mode will now be described in detail.

In response to the start-up of the facsimile device, the main controller 22 of the facsimile device proper 2 reads the phase values Fm and Fn out of the phase value memory 3 (step 101), analyzes these phase values, determines whether both the phase values Fm and Fn values are maintained at "0" (when each application program is normally terminated) (step 102) and, if so, shifts to a standby state where it awaits a command input by the operator via the panel 24 (step 103), as mentioned above. By the designation of the "multicopy" mode by the operator, the main control unit 22 executes the application operation in the designated "multicopy" mode in the following recited aspects:

(1) The main controller 22 first writes in a registering area preserved in the phase value memory 3 the number of copies input to the operation subsequent to the designation of the "multicopy" mode (step 300). When the registration of the numerical value indicative of the number of copies is terminated (for example, by pressing a start button usually provided on the panel section 24), the main controller updates the phase value Fm with "2" indicative of the selection of the phase value Fm by the "multicopy" program, and the phase value Fn with "1" indicative of the next phase in the "multicopy" program (step 301). The update of the phase value Fm may be executed when the mode designation by the operator is performed. The phase structure which the value memory 3 has when the "multicopy" mode is designated is, for example, shown in FIG. 6 in which reference numeral 31a denotes a phase value Fm registering area; 31b, a phase value Fn registering area; and 32, a number-of-copies (which will be a "subphase") registering area.

(2) When the main controller 22 has executed the update of the phase values (step 301), it again reads phase values Fm and Fn out of the phase value memory 3 (step 101) and analyzes these phase values.

(3) By the update of the phase values (step 301), the phase values Fm and Fn values are "2" and "1", respectively, at this time, and the main controller 22 recognizes this fact (step 310), starts to read a document via the scanner 25 and sequentially stores the read image data in the file section 28 (step 311).

(4) In this way, when the storage of the image data is terminated (step 312), the main controller 22 updates only the phase value Fn with "2" indicative of the next phase in the "multicopy" program (step 313).

(5) Subsequently, the main controller 22 reads the phase values Fm and Fn out of the phase value memory 3 (step 101) and analyzes these values.

(6) By the update of the phase values (step 313), both the phase values Fm and Fn are "2". The main controller 22 recognizes this fact (step 320) and starts to print the image data stored in the file unit 28 via the recorder 26 (step 321).

(7) When the printing of the designated file (image data) is terminated (step 322), the main controller 22 decrements the value of the subphase N (the number of copies) stored in the phase value memory 3 (step 323), and determines whether the decremented subphase N value is "0" (step 324). As long as "1" is not designated as the number of copies, the main controller does not determine that the decremented subphase N value is "0".

(8) As long as the main controller 22 does not determine that the subphase N value is "0", it repeats steps 101, 320, 321, 322, 323 and 324 sequentially in a manner similar to that mentioned above, refers the value indicated by the decremented subphase N or the value indicative of the remaining number of copies and prints only the designated number of pages each time the repetition of the steps is performed once.

(9) When the main controller determines that the subphase N value is "0" at step 324, it updates both of the phase values Fm and Fn to "0" (step 325), and shifts to a standby state where it awaits the next command input by the operator through the steps 101 and 102 (step 103).

Figure 7:
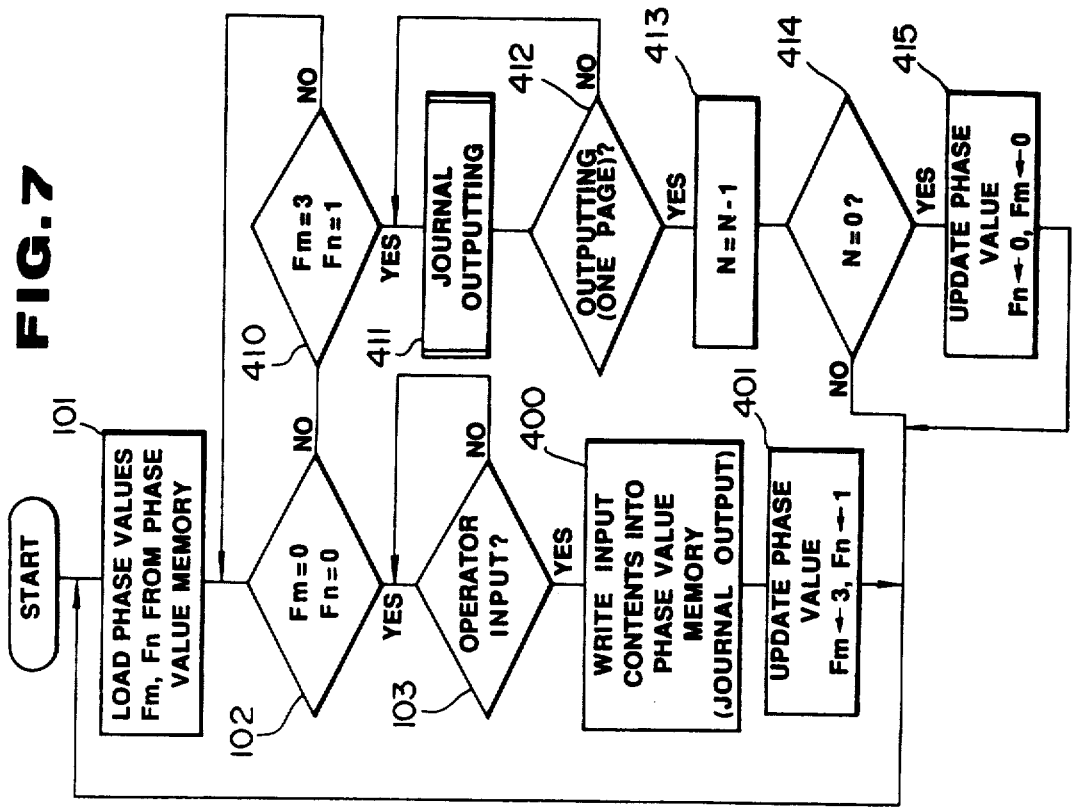
FIG. 7 is a flowchart illustrating the execution of a journal output application program by the inventive facsimile device as one embodiment of a process for executing an application program by the facsimile device.
Figure 8:
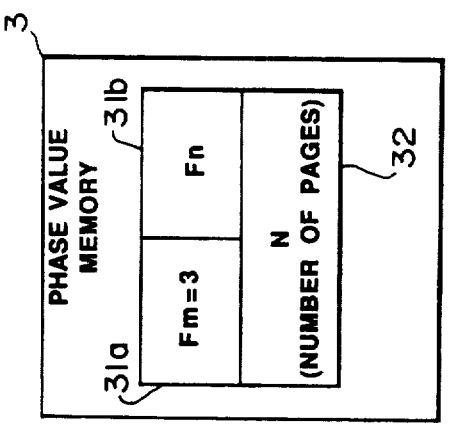
FIG. 8 schematically illustrates the structure of a phase value memory shown in FIG. 1 used when the journal output application program is executed.

Lastly, the illustrative execution of an application program of the facsimile device of the particular embodiment in the "journal output" mode will be described. FIG. 7 illustrates the operation of the facsimile device when the "journal output" mode is designated by the user or the "journal output" program is selected. FIG. 8 schematically illustrates the structure of the phase value memory 3 when the "journal output" mode is designated. Referring to FIGS. 7 and 8, the operation of the facsimile device in the "journal output" mode will be described in detail. Also in this case, in response to start-up of the facsimile device, the main controller 22 of the facsimile device proper 22 reads the phase values Fm and Fn out of the phase value memory 3 (step 101), and analyzes these values, determines whether these phase values are maintained at "0" (when each application program is normally terminated) (step 102), and, if so, shifts to a standby state where it awaits a command input by the operator via the panel 24 (step 103), as in the operation mentioned above. When the operation of designating the "journal output" mode is performed by the operator, the main controller 22 executes the application operation in the designated "journal output" mode in the following recited aspects:

(1) The main controller 22, first, writes the desired number of output pages, input by the operator subsequent to the designation of the "journal output" mode, in the registering area preserved in the phase value memory 3 (step 400), and updates the phase values Fm and Fn to "3" and "1" indicative of the selection of the "journal output" program and the next phase in the "journal output" program, respectively, when the register of the values indicative of the number of pages is terminated (for example, by pressing a start button usually provided on the panel 24) (step 401). The update of the phase value Fm may be performed when the above mode is designated by the operator. Thus, the structure which the phase value memory 3 has when the "journal output" mode is designated is shown in FIG. 8 where reference numeral 31a denotes a phase value Fm registering area; 31b, a phase value Fn registering area; and 32, a desired-number-of-output-pages N (which will be a subphase) registering area.

(2) When the main controller 22 has executed the update of the phase value (step 401), it again reads the phase values Fm and Fn out of the phase value memory 3 (step 101) and analyzes these phase values.

(3) By the update of the phase values (step 401), the phase value Fm and Fn values are "3" and "1", respectively, at this time. The main controller 22 recognizes this fact (step 410) and starts to output or print the journal filed, for example, in the file unit 28 via the recorder 26 (step 411).

(4) When outputting or printing one page of the journal is terminated (step 412), the main controller 22 decrements the value of the subphase N (the number of pages) registered in the phase value memory 3 (step 413), and determines whether the decremented subphase N value is "0" (step 414). As long as the desired number of output pages is not designated as "1", the main controller does not determine that the decremented subphase N value is "0" at this time.

(5) During the time when the main controller 22 determines that the subphase N value is not "0", it repeats steps 101, 410, 411, 412, 413 and 414 sequentially and refers to the value indicated by the decremented subphase N or the value indicative of the remaining number of pages and outputs the journal by the designated number of pages each time the repetition of the steps is performed once.

(6) When the main controller 22 determines that the subphase N value has becomes "0" at step 414, it updates both the phase values Fm and Fn with "0" (step 415), and shift to a standby state where it awaits the next command input by the operator through the steps 101 and 102 (step 103).

As described above, in the facsimile device of the particular embodiment, phase values Fm and Fn are beforehand allocated to each of any number of phases to which each application program is divided. Each time some processing is performed in units of a phase, phase values Fm and Fn corresponding to the phases to be executed next are registered in the phase value memory 3 which comprises a non-volatile memory. When the facsimile device is started up, the analysis of the phase values Fm and Fn read at step 101 is first executed in any case. Therefore, even if trouble such as a power stoppage occurs in the course of the application operation in the "concurrent transmission" mode, the "multicopy" mode or the "journal output" mode, the application operation is reopened automatically instantaneously from the interrupted operation of the interrupted application program or from the next operation of the application program to be performed on the basis of the phase values Fm and Fn registered in the phase value memory 3 when the facsimile device is recovered from the trouble and the facsimile device is restarted.

Furthermore, in the particular embodiment and in the phase where processes having the same contents are repeated, the number of processes is controlled by providing subphases such as mentioned above, and the values of the subphases are sequentially registered in the phase value memory 3. Therefore, even if trouble occurs during the repeated processing, useless double processing which would otherwise be performed when the facsimile device is recovered from the trouble is avoided satisfactorily. Application programs which do not contain repeated processing of the same contents are only required to basically have a program structure such as that shown in FIG. 2.

The illustrated programs as well as respective application programs themselves may have any contents. For example, an application program may have contents to which the "journal output" processing can be added as the last processing in the "concurrent transmission" mode or in the "multicopy" mode. In summary, the program is only required to basically have a structure shown in FIG. 2 where the program is divided beforehand into a plurality phases each being allocated a phase value for identifying purposes.

The number of divisions and/or the manner of division as phases of these application programs are optional. Each program may be divided freely into phases in accordance with contents to be processed. Generally, as process units as phases into which a program is divided are smaller, the efficiency of the process reopened when the facsimile device is recovered from trouble is further improved. Namely, useless double processing is reduced. Since the contents of the main memory 23 are lost concurrently with the occurrence of power stoppage, the phase preferably comprises a minimum process unit which is not influenced by the contents stored temporarily in the main memory 23. For example, in the "concurrent transmission" mode, the destination number registered in correspondence to the arrangement A [i] referred to in accordance with the subphase i value is temporarily read into the main memory 23 and the temporarily read number is recognized as the transmission destination at that time (step 221 in FIG. 3). As an extreme example, assume that the phase division unit set is a unit smaller than the process for reading a row of destination numbers into the main memory 23, that power stoppage occurs during reading of the number and that the facsimile device is restarted in response to subsequent recovery from the trouble. Reading into the main memory 23 is reopened newly from a number in the row of destination numbers, and a number different from the correct destination number would be recognized as a new destination number. In this case, if the phase division structure of the application program is set such that the process for reading into the main memory 23 at least one row of destination numbers is one phase, such undesirable situation would not occur. This applies to other processes.

While in the embodiments of FIGS. 3-8 two phase values, namely, the first phase value Fm for identifying each of the application programs and a second phase value Fn for identifying each of phases to which the corresponding application program is beforehand divided are used to identify the operational mode designated by the operator when required, the first phase value Fm may be eliminated and all the second phase values Fn of all the application programs may be set as serial numbers. In this case, when the operational mode is designated by the operator, the contents of the phase value memory should be updated with the head phase value of the corresponding application program, which produces effects similar to those mentioned above.

What is claimed is:

1. A method of executing an application program in a facsimile device having a main controller for controlling an execution of the application program and a first non-volatile memory for storing the application program, wherein the application program has a predetermined set of operations to be executed and is divided into a predetermined plurality of subprograms, the plurality of subprograms corresponding to a plurality of application program phases, wherein each one of the plurality of application program phases is assigned a phase value by the main controller and wherein a predetermined phase value is stored in a second non-volatile memory, the method performed by the main controller and comprising the steps of:

specifying an application program phase to be executed, in accordance with the predetermined phase value stored in the second non-volatile memory;

executing one of the plurality of subprograms corresponding to the specified application program phase;

updating the phase value stored in the second non-volatile memory with a phase value of an application program phase corresponding to a subprogram to be next executed, in response to termination of the execution of the subprogram executed in the executing step; and repeating the specifying step, executing step, and updating step sequentially during execution of the application program, said phase values being continually stored in the second non-volatile memory corresponding to the application program phase being executed, wherein the repeating step, at times when an operation is stopped, allows an automatic restarting of the operation from a same or a similar condition which existed immediate prior to the stoppage of the operation, thereby restoring and continuing the operation.

2. The method of executing an application program in a facsimile device according to claim 1, wherein the phase value of an application program phase corresponding to a subprogram to be first executed is stored as the predetermined phase value in the second non-volatile memory, and wherein the phase value stored in the second non-volatile memory is initialized and updated in the updating step when the application program is normally terminated.

3. The method of executing an application program in a facsimile device according to claim 2, wherein respective phase values are numbers sequentially increasing from the phase value to be first executed, and wherein the phase value stored in the second non-volatile memory is updated in the updating step by incrementing the phase value stored in the second non-volatile memory.

4. The method of executing an application program of a facsimile device according to claim 1, wherein upon satisfying starting conditions for the facsimile device, the specifying step is executed.

5. The method of executing an application program of a facsimile device according to claim 1, wherein each one of the application program phases includes a subphase, the subphase assigned an identifying subphase value stored int he second non-volatile memory for managing a number of repetitions of an appropriate process, and further including a fourth step of updating the subphase value in the updating step until the repetition of the appropriate process is terminated.

6. A facsimile device having a function of automatically reopening the execution of an application program in response to recover from trouble, comprising:

program memory means for storing the application program, wherein the application program is divided into a predetermined plurality of subprograms, the subprograms corresponding to a plurality of application program phases, wherein each one of the plurality of application program phases is assigned a phase value;

non-volatile read/write memory means for continually storing ones of the plurality of phase values and for storing parameters designated or input by a user;

first control means for recognizing a phase value stored in the non-volatile read/write memory means for specifying one of the plurality of subprograms identified by the phase value;

second control means for referring to the parameters stored in the non-volatile read/write memory means and for executing he subprogram specified by the first control means;

third control means for updating the phase value stored in the non-volatile read/write memory means with a phase value of an application program phase corresponding to a next subprogram to be next executed, in response to termination of the execution of the subprogram by the second control means;

fourth control means for starting the first control means in response to the update of the phase value by the third control means; and fifth control means for starting up the first control means in response to start-up of the facsimile device.

7. The facsimile device according to claim 6, wherein the facsimile device includes a volatile work storage area for temporarily storing data to be processed when the application program is executed, and wherein each one of the application program phases includes a minimum unit which is a minimum processing unit of the application program in which data stored concurrently in the volatile work storage area can be recognized accurately.

8. The facsimile device according to claim 6, wherein the non-volatile read/write memory means includes a RAM backed up by a battery.

* * * * *

UNITED STATES PATENT AND TRADEMARK OFFICE
CERTIFICATE OF CORRECTION

PATENT NO. : 5,253,360
DATED : October 12, 1993
INVENTOR(S) : Katsuhiko Hayashi

It is certified that error appears in the above-indentified patent and that said Letters Patent is hereby corrected as shown below:

Related U.S. Application Data, title page, line 1, change "Dec. 12," to --Dec. 19,--.

On the title page and in column 1, line 1-4:

Change the title "FACSIMILE DEVICE HAVING CONTINUOUS OPERATING CAPABILITES IMMEDIATELY AFTER RECOVERY FROM TROUBLE AND RELATED METHOD" to --FACSIMILE SYSTEM HAVING CONTINUOUS OPERATING CAPABILITES IMMEDIATLEY AFTER RECOVERY BY EXECUTING APPLICATION PROGRAMS IN PHASES WITH PREDETERMINED VALUES--.

Claim 1, column 12, line 48, change "immediate" to --immediately--.

Claim 5, column 13, line 7, change "int he" to --in the--.

UNITED STATES PATENT AND TRADEMARK OFFICE
CERTIFICATE OF CORRECTION

PATENT NO. : 5,253,360
DATED : October 12, 1993
INVENTOR(S) : Katsuhiko Hayashi

It is certified that error appears in the above-indentified patent and that said Letters Patent is hereby corrected as shown below:

Claim 6, column 14, line 3, change "he" to --the--.

Signed and Sealed this

Thirteenth Day of September, 1994

*Attest:*

BRUCE LEHMAN

*Attesting Officer*     *Commissioner of Patents and Trademarks*